(12) United States Patent
Luthra et al.

(10) Patent No.: US 12,101,234 B2
(45) Date of Patent: Sep. 24, 2024

(54) SYSTEM AND METHOD FOR DESIGN OF A NETWORK SLICE

(71) Applicant: Rakuten Mobile, Inc., Tokyo (JP)

(72) Inventors: Mohit Luthra, Singapore (SG); Jithin Chathankandath, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/998,928

(22) PCT Filed: Aug. 31, 2022

(86) PCT No.: PCT/US2022/042178
§ 371 (c)(1),
(2) Date: Nov. 16, 2022

(87) PCT Pub. No.: WO2024/049429
PCT Pub. Date: Mar. 7, 2024

(65) Prior Publication Data
US 2024/0267302 A1  Aug. 8, 2024

(51) Int. Cl.
*H04L 41/50* (2022.01)
(52) U.S. Cl.
CPC .................. *H04L 41/50* (2013.01)
(58) Field of Classification Search
CPC ........................................ H04L 41/50
USPC ........................................ 709/220
See application file for complete search history.

(56) References Cited

U.S. PATENT DOCUMENTS

| | | | |
|---|---|---|---|
| 2019/0281522 A1* | 9/2019 | Wong | H04W 28/0268 |
| 2021/0036920 A1* | 2/2021 | Erman | H04L 41/0894 |
| 2021/0117242 A1* | 4/2021 | Van De Groenendaal | H04L 67/1001 |
| 2021/0136162 A1* | 5/2021 | Young | H04L 41/0806 |
| 2022/0052929 A1* | 2/2022 | Priya | H04L 41/5051 |
| 2023/0142350 A1* | 5/2023 | Priya | H04W 48/18 370/329 |
| 2023/0276211 A1* | 8/2023 | Kozlova | H04W 4/50 455/224 |

FOREIGN PATENT DOCUMENTS

| | | | | |
|---|---|---|---|---|
| CN | 112492580 A | * | 3/2021 | ......... H04L 41/0893 |
| KR | 20200079352 A | * | 7/2020 | ............ H04L 41/50 |
| WO | WO-2020063201 A1 | * | 4/2020 | ......... H04L 41/0806 |
| WO | WO-2021181408 A1 | * | 9/2021 | ......... H04L 41/5051 |

OTHER PUBLICATIONS

Qin, Network Slicing Use Case Requirements, Apr. 2018, GSMA, 54 pages (Year: 2018).*

* cited by examiner

*Primary Examiner* — Wing F Chan
*Assistant Examiner* — Leon Y Tseng
(74) *Attorney, Agent, or Firm* — HAUPTMAN HAM, LLP

(57) ABSTRACT

A method includes generating, by a processor, a network slice bundle universally unique identifier (slice_bundle_UUID) for a network slice bundle; and generating, by the processor, a slice catalog slice_bundle_UUID, based on the slice_bundle_UUID, for use by a slice catalog; parsing and locating in the slice catalog, by the processor, one or more stored network service bundle references, based on a network service UUID (NS_UUID) referenced in the network slice bundle; and creating, by the processor, a relationship between one or more stored network services in the slice catalog and the network slice bundle.

20 Claims, 18 Drawing Sheets

300

| Status | Name | Slice Service Type | ServiceCategory | Domain | Vendor | Version | Shared | Created Date | Last M... |
|---|---|---|---|---|---|---|---|---|---|
| ⊙ Active | Slice Template for Mobile | eMBB | Home Automation | RAN | ABC | 1.0.0 | Yes | xx/xx/xxxx | xx/xx/xxxx |
| ⊙ Inactive | Slice Template for TV | Custom | High Speed Train | TRANSPORT | GHI, ABC | 1.0.1 | No | xx/xx/xxxx | xx/xx/xxxx |
| ⊙ Active | Slice Template for game | uRLLC | Home Automation | CORE | DEF | 1.0.0 | Yes | xx/xx/xxxx | xx/xx/xxxx |
| ⊙ Active | Slice Template for IoT | mIoT | High Speed Train | E2E | GHI, DEF | 2.0.0 | No | xx/xx/xxxx | xx/xx/xxxx |
| ⊙ Active | Slice Template for Mobile | eMBB | Home Automation | RAN | DEF, ABC | 1.5.0 | Yes | xx/xx/xxxx | xx/xx/xxxx |
| ⊙ Inactive | Slice Template for TV | Custom | High Speed Train | TRANSPORT | ABC | 3.0.0 | No | xx/xx/xxxx | xx/xx/xxxx |
| ⊙ Active | Slice Template for game | uRLLC | Home Automation | CORE | GHI | 4.0.0 | Yes | xx/xx/xxxx | xx/xx/xxxx |
| ⊙ Active | Slice Template for IoT | mIoT | High Speed Train | E2E | GHI, ABC | 1.0.0 | No | xx/xx/xxxx | xx/xx/xxxx |
| ⊙ Inactive | Slice Template for Mobile | eMBB | Home Automation | RAN | DEF | 1.0.1 | Yes | xx/xx/xxxx | xx/xx/xxxx |
| ⊙ Active | Slice Template for TV | Custom | High Speed Train | TRANSPORT | GHI, DEF | 1.0.0 | No | xx/xx/xxxx | xx/xx/xxxx |
| ⊙ Inactive | Slice Template for game | uRLLC | Home Automation | CORE | DEF, ABC | 2.0.0 | Yes | xx/xx/xxxx | xx/xx/xxxx |
| ⊙ Active | Slice Template for IoT | mIoT | High Speed Train | E2E | GHI | 1.5.0 | No | xx/xx/xxxx | xx/xx/xxxx |
| ⊙ Inactive | Slice Template for Mobile | eMBB | Home Automation | RAN | ABC | 3.0.0 | Yes | xx/xx/xxxx | xx/xx/xxxx |
| ⊙ Inactive | Slice Template for TV | Custom | High Speed Train | TRANSPORT | GHI, ABC | 4.0.0 | No | xx/xx/xxxx | xx/xx/xxxx |
| ⊙ Active | Slice Template for game | uRLLC | Home Automation | CORE | DEF | 1.0.0 | Yes | xx/xx/xxxx | xx/xx/xxxx |
| ⊙ Inactive | Slice Template for IoT | mIoT | High Speed Train | E2E | GHI, DEF | 1.0.1 | No | xx/xx/xxxx | xx/xx/xxxx |
| ⊙ Active | Slice Template for Mobile | eMBB | Home Automation | RAN | DEF, ABC | 1.0.0 | Yes | xx/xx/xxxx | xx/xx/xxxx |

Orchestrator

LCM > ... > Create New Slice Design

⊙ Basic Information — ⊙ Slice Definition — ⊙ Slice Subnet Profile — ○ SLAS — ○ Preview

Select Subnet and Check Feasibility

RAN

| Network Slice Subnet Name* | Network Service | Feasibility Status |
|---|---|---|
| eMBB RAN NSSI 1, High | UHN1TKY100401123 +3 | ⊗ Failed |
| eMBB | | |
| eMBB RAN NSSI 1, High | | |
| eMBB RAN NSSI2. High | Network Service | Feasibility Status |
| eMBB RAN NSSI 3, Medium | UHN1TKY100401245 +5 ✎ | ⊙ Success |
| eMBB RAN NSSI 4, LOW | | |

Transport

| Network Slice Subnet Template* | Transport Path | Feasibility Status |
|---|---|---|
| eMBB TN Dedicated Template1 | EP Transport test - N3 ✎ | ⊙ Success |

[Check for Feasibility] — 1002

[Previous]    [Cancel] [Next]

Orchestrator

≡ LCM > ... > Create New Slice Design

⊙ Basic Information — ⊙ Slice Definition — ⊙ Slice Subnet Profile — ⊙ SLAs — ○ Preview 🔍 Search    All ▾

Configure Automation Policies

1306 — 🔍 Search    1310 — RAN ▾

- Max Number of UEs
- Latency
- Resource Sharing Level
- Downlink Throughput Per Slice (Mbps)
- Downlink Throughput Per UE (Mbps)

1308

Max Number of UEs ✕ | Downlink Throughput Per Slice (Mbps) ✕ | Downlink Throughput Per UE (Mbps) ✕
Uplink Throughput Per Slice (Mbps) ✕ | Uplink Throughput Per UE (Mbps) ✕ | Availability (%) ✕

1302

Select Policy to Trigger
Policy Name*
MME TOTSUKA Auto Scale up Policy 🔍 — 1304

LMP ID
9251

CR Information

CR Title / CR ID*
Addition of Lcoation CR-GEN-110920-129980028498.1 🔍

⤓ LAB Test Result Release Certificate    LMP-Ticket Details

[Previous]    [Cancel] [Next]

SYSTEM AND METHOD FOR DESIGN OF A NETWORK SLICE

RELATED APPLICATIONS

The present application is a National Phase of International Application No. PCT/US2022/042178, filed Aug. 31, 2022.

TECHNICAL FIELD

This description relates to a system for design of a network slice and method using the same.

BACKGROUND

A cellular network is a telecommunication system of mobile devices (e.g., mobile phone devices) that communicate by radio waves through one or more local antenna at a cellular base station (e.g., cell tower). The coverage area in which service is provided is divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provides connection with a core network (CN). Depending on the standard, mobile phones and other wireless connected devices are varyingly known as user equipment (UE), terminal equipment (TE), mobile station (MS), and the like.

SUMMARY

In some embodiments, a method includes generating, by a processor, a network slice bundle universally unique identifier (slice_bundle_UUID) for a network slice bundle; and generating, by the processor, a slice catalog slice_bundle_UUID, based on the slice_bundle_UUID, for use by a slice catalog; parsing and locating in the slice catalog, by the processor, one or more stored network service bundle references, based on a network service UUID (NS_UUID) referenced in the network slice bundle; and creating, by the processor, a relationship between one or more stored network services in the slice catalog and the network slice bundle.

In some embodiments, an apparatus includes a processor; and a memory having instructions stored thereon that, when executed by the processor, cause the processor to generate a network slice bundle universally unique identifier (slice_bundle_UUID) for a network slice bundle; and generate a slice catalog slice_bundle_UUID, based on the slice_bundle_UUID, for use by a slice catalog;
  parse and locate in the slice catalog one or more stored network service bundle references, based on a network service UUID (NS_UUID) referenced in the network slice bundle; and create a relationship between one or more stored network services in the slice catalog and the network slice bundle.

In some embodiments, a non-transitory computer readable medium having instructions stored thereon that, when executed by a processor, cause the processor to generate a network slice bundle universally unique identifier (slice_bundle_UUID) for a network slice bundle; and generate a slice catalog slice_bundle_UUID, based on the slice_bundle_UUID, for use by a slice catalog; parse and locate in the slice catalog one or more stored network service bundle references, based on a network service UUID (NS_UUID) referenced in the network slice bundle; and create a relationship between one or more stored network services in the slice catalog and the network slice bundle.

BRIEF DESCRIPTION OF THE DRAWINGS

Aspects of the present disclosure are understood from the following detailed description when read with the accompanying FIGS. In accordance with the standard practice in the industry, various features are not drawn to scale. In some embodiments, dimensions of the various features are arbitrarily increased or reduced for clarity of discussion.

FIGS. 3-15 are graphic user interfaces (GUIs) for designing a network slice, in accordance with some embodiments.

DETAILED DESCRIPTION

Figure 1:
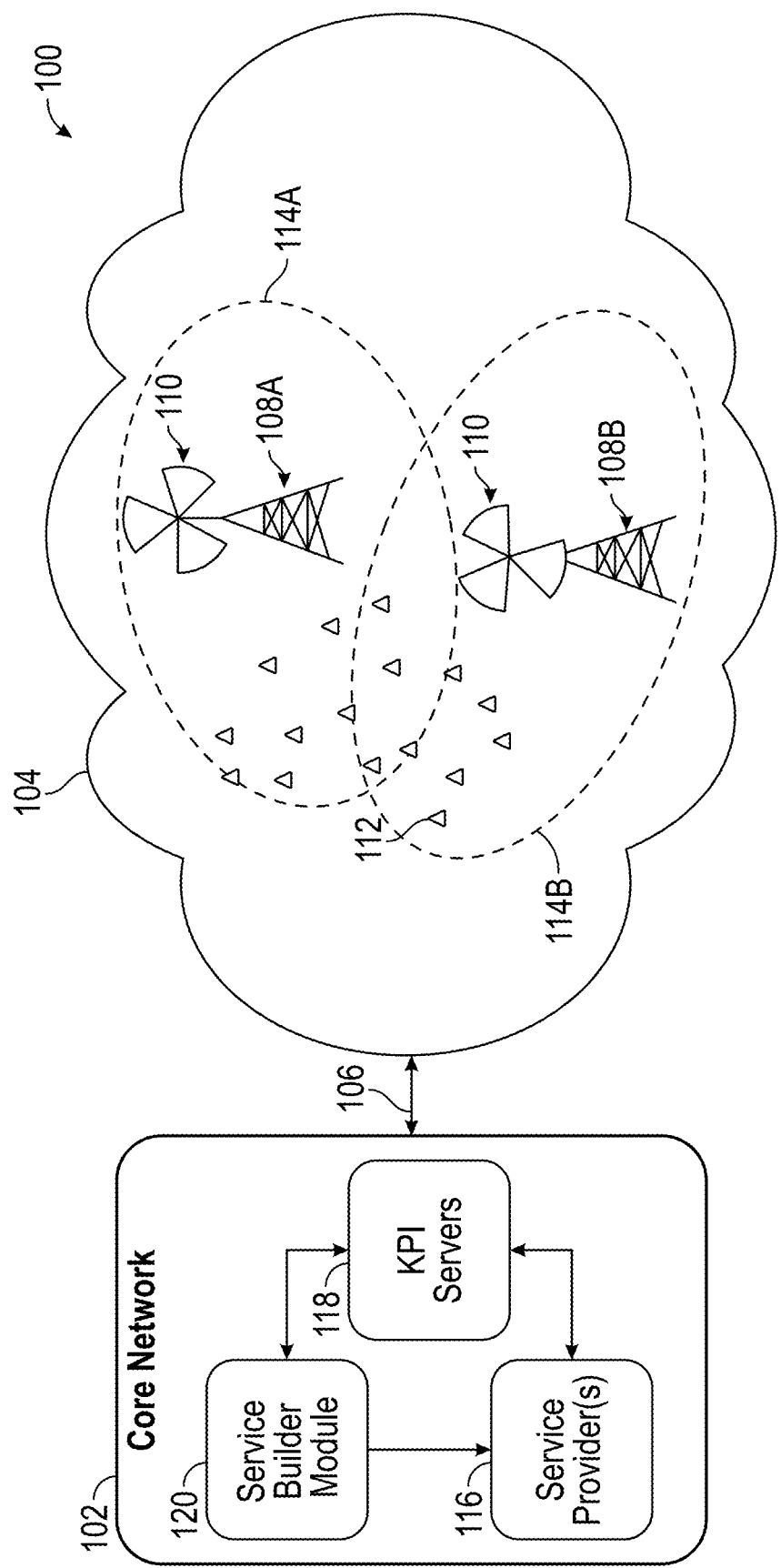
FIG. 1 is a diagrammatic representation of a system for network slice design (NSD), in accordance with some embodiments.

The following disclosure provides many different embodiments, or examples, for implementing distinctive features of the discussed subject matter. Examples of components, values, operations, materials, arrangements, or the like, are described below to simplify the present disclosure. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a system and method for designing a network slice from a graphical user interface (GUI) displayed on a user interface (UI) are discussed.

Network slicing (or 5G network slicing) is a network architecture that enables the multiplexing of virtualized and independent logical networks on the same physical network infrastructure. Each network slice is an isolated end-to-end (E2E) network tailored to fulfil diverse requirements requested by a particular application. For this reason, this technology assumes a leading role to support 5G mobile networks that are designed to efficiently handle a plethora of services with different service level requirements (SLR). The realization of this service-oriented view of the network leverages on the concepts of software-defined networking (SDN) and network function virtualization (NFV) that allow the implementation of flexible and scalable network slices on top of a network infrastructure. Each network slice is administrated by a mobile virtual network operator (MVNO). The infrastructure provider (the owner of the telecommunication infrastructure) leases physical resources to the MVNOs that share the underlying physical network. According to the availability of the assigned resources, a MVNO autonomously deploys multiple network slices that are customized to the various applications provided to users. In some embodiments, the MVNO and infrastructure provider are one in the same; that is a service provider. In some embodiments, the service provider is the MVNO.

A UI is the space where interactions between humans and machines occur. The goal of this interaction is to allow effective operation and control of a machine from the human end, while the machine simultaneously feeds back information that aids the operators' decision-making process. Examples include the interactive aspects of computer operating systems, hand tools, heavy machinery operator controls, and process controls. UIs include one or more layers, including a human-machine interface (HMI) that interfaces machines with physical input hardware such as keyboards, mice, or game pads, and output hardware such as computer monitors, speakers, and printers. A device that implements an HMI is called a human interface device (HID). Other terms for human-machine interfaces are man-machine interface (MMI) and, when the machine in question is a computer, human-computer interface. Additional UI layers may interact with one or more human senses, including: tactile UI (touch), visual UI (sight), auditory UI (sound), olfactory UI (smell), equilibria UI (balance), and gustatory UI (taste).

The GUI is a form of UI that allows users to interact with electronic devices through graphical icons and audio indicators such as primary notation, instead of text-based UIs, typed command labels, or text navigation. The actions in a GUI are usually performed through direct manipulation of the graphical elements. GUIs are used in many handheld mobile devices such as MP3 players, portable media players, gaming devices, smartphones, and smaller household, office, and industrial controls.

In other approaches, when a user onboards (implements) a network slice, the user manually registers each domain application file. For example, one end to end (E2E) slice includes three domains: RAN, core, and transport. Continuing with the example, a user creates bundle files for the RAN domain, uploads them into a system, then configures and deploys each manually. Next, the user moves to the core domain files, which are uploaded to the system, configured, and deployed manually. Once the three domain files are deployed, then one domain is manually notified about having been linked to another domain specific version. In scenarios where there are multiple versions of a single domain this creates a time and labor-intensive task. Manual onboarding of a network slice is time and labor intensive and includes the risk of human error. Further, the user manually delineates relationships between cross domain bundles, which takes additional time and labor.

In some embodiments, the complexity of including individual onboarding into the system and then later linking to create one E2E network slice is mitigated. In some embodiments, a process to onboard a network slice that include cross domain interactions and enables automated onboarding of the network slice is discussed. In some embodiments, the automated process reduces the time taken to onboard a network slice as well as reducing human error.

In some embodiments, the process is a two-step process. The first process is directed toward adding folders in a universal bundle for the network slice subnets. A network slice subnet (NS subnet) is a network system that includes groups of connectivity resources, compute resources, and storage resources, possibly including network functions (NF) and network management entities, forming a complete instantiated logical/physical network in support of certain network and service characteristics. A NS subnet is unable to be activated in isolation as an overall (end-to-end) network slice but is interconnected with other slice subnets to form a network slice. The second process is directed toward automated interactions with various modules for slice bundle registration to a slice catalog.

In some embodiments, the first process related to creating the universal slice bundle includes adding new folders that cater to network slices in a technology services folder. In response to a user designing network slices on a service builder module, the module automatically places relevant files with relevant folders. This action assists a network slice manager to search for dedicated folders and extract network slice related files and storing in the slice catalog.

In some embodiments, each folder of respective network slice domain includes one or more of the following files: slice subnet domain deployment files, slice subnet domain configuration files, and slice subnet domain policy files. Deployment files are used for slice subnet deployment on the Cloud. Configuration files are used to configure the slice subnet. Policy files are used, to create closed to policy in the policy engine to maintain the service level agreement (SLA) of the network slice.

For purposes of discussion of examples of the present disclosure, files are discussed as being YAML files. Nevertheless, examples of the present disclosure are not limited to YAML files and other software languages within the scope of the present embodiments are contemplated. YAML (.yaml) is a human-readable data-serialization language. YAML is used for configuration files and in applications where data is being stored or transmitted. YAML targets many of the same communication applications as extensible markup language (XML) but minimal syntax.

A network slice is broken up into NS subnets where each subnet is dedicated to a specific domain (e.g., RAN, CN, transport domain, or E2E that includes each). The transport domain references the telecommunication transmission facilities under which voice, data, and video communications are distributed between distant locations for use on a shared basis.

Within a NS subnet is one or more network services. For example, within a RAN slice subnet is a network service, such as g node B (gNB is a third-generation partnership project (3GPP) 5G next generation base station which supports 5G new radio). Within a CN slice subnet is a network service, such as NRF (a network repository function which is a function of the 3GPP service-based architecture (SBA) for 5G CNs acting as a central services broker for all NFs in the 5G CN) or AMF (access and mobility management function that receives connection and session related information from the UE for handling connection and mobility management tasks). Within a transport slice subnet is a transport network service.

Within a network service is one or more network functions. For example, within a gNB network service are network functions, such as DU (a distributed unit supports one or more cells supporting radio link control (RLC), medium access control (MAC) and the physical layer), CUCP (central unit control plane hosts radio resource control (RRC) and the control-plane part of the packet data convergence protocol (PDCP)), and CUUP (central unit user plane is a logical node hosting the user plane part of the PDCP protocol of the gNB-CU for a gNB, and the user plane part of the PDCP protocol of the gNB-CU for an en-gNB or a gNB).

Within a NRF network service are network functions, such as MongoDB (an open-source NoSQL database management program), NRF (provides a single record of NFs available in each public land mobile network (PLMN), together with the profile of each and the services supported) and Redis (an in-memory data structure store, used as a distributed, in-memory key-value database, cache and message broker, with optional durability). Further, within an AMF network service are network functions such as Nginx (an open-source Web server software that performs reverse proxy, load balancing, email proxy, and HTTP cache services), AMF application, and database (DB).

Within a transport network service are network functions, such as software (SW), SDN (an approach to network management that enables dynamic, programmatically efficient network configurations to improve network performance and monitoring, more like cloud computing than traditional network management), and router (a networking device that forwards data packets between computer networks).

In some embodiments, the slice manager is responsible for creating a network slice and NS subnet, whereas orchestrator is responsible for creating network services and network functions. In prior approaches, when a user manually creates network slice bundles, the user provides references to each respective domain network service as well. In some embodiments, a service builder tool includes references to network service bundles as the references were created from the slice manager. Further, in response to the user creating the network slice bundles, the user chooses available network service bundles, and the service builder tool automatically adds references to unique ID (universally unique identifier (UUID) format) of respective selected service bundles.

A UUID is a 128-bit label used for information in computer systems. When generated according to the standard methods, UUIDs are, for practical purposes, unique. Their uniqueness does not depend on a central registration authority or coordination between the parties generating them, unlike most other numbering schemes. While the probability that a UUID will be duplicated is not zero, it is close enough to zero to be negligible. Information labeled with UUIDs by independent parties are able to be later combined into a single database or transmitted on the same channel, with a negligible probability of duplication.

In some embodiments, in response to the user creating a slice bundle (e.g., the user creates nst.yaml file for a network slice and nsst.yaml files for each of the respective domains (NS subnet)), the user adds reference to network service bundle IDs (e.g., NS_UUID) in each nsst.yaml file.

In some embodiments, the slice manager receives the slice bundle and locates the references of the network service bundle from a bundle catalog (coupled to or part of the orchestrator) and creates the service relationship and stores the service relationship in a slice catalog (coupled to or part of the slice manager).

In some embodiments, the process includes the user designing the NF application bundle on a service builder tool UI. In response to submission of the NF application, the service builder tool creates a NF bundle unique ID (e.g., Bundle_UUID) and automatically registers the NF or application bundle to the bundle catalog of the orchestrator via an application programming interface (API). In response to being registered, the bundle catalog generates an ID (e.g., NF_Catalog_ID) and keeps the value the same as the NF bundle unique ID (Bundle_UUID). In some embodiments, when a bundle is registered to the catalog, the catalog generates a single ID that follows the bundle throughout a process (FIG. 17), so the assigned bundle ID remains the same. In some embodiments, the assigned bundle IDs change from operation to operation. In some embodiments, the assigned bundle IDs change based upon the orchestrator.

In some embodiments, the user designs the network service bundle on the service builder tool UI through a GUI. The user provides references to the NF bundles included in the NS bundle. Once user provides references to NF bundles, references are attached using the NF bundle unique ID (Bundle_UUID).

In some embodiments, the service builder tool automatically generates a network service ID (e.g., NS_UUID) for a network service bundle and passes a network service ID (NS_UUID) and the referenced NF bundle unique IDs (Bundle_UUIDs) to the bundle catalog, where the bundle catalog generates a network service bundle unique ID (e.g., NS_Bundle_UUID having the same value as NS_UUID) for reference and uses referenced NF bundle unique ID (Bundle_UUID) to parse and find internal NF bundle references, create relationships between stored NFs and newly registered network service in the bundle catalog's own database, and stores the information.

In some embodiments, the user designs the NS bundle on the service builder tool UI. The user provides references to network service bundles included in the NS bundle. In response the references are attached using network service bundle unique IDs (NS_UUIDs).

In some embodiments, the service builder tool automatically generates a slice bundle UUID for the slice bundle and passes referenced network service bundle unique IDs (NS_UUIDs) to the slice catalog, where the slice catalog generates a slice bundle UUID (Slice_Bundle_UUID) for the slice catalog's references and uses network service bundle unique IDs (NS_UUID) to parse and find internal network service bundle references, creates relationship between stored network service and the newly registered network slice in the slice catalog's database and stores the information. In some embodiments, the slice catalog creates a relationship with network service bundles stored in the bundle catalog.

FIG. 1 is a diagrammatic representation of a system for network slice design (NSD) 100, in accordance with some embodiments.

NSD system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and service builder module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, transport network 106 of NSD system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, base stations are replaced with other edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 1822 (FIG. 18), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200m-2 Km), or a pico-cell (covering 4m-200m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

KPI servers 118 produce both predictions and live network data. Live-network data (KPIs, UE/cell/MDT (minimization of drive test) traces, and crowdsourced data) that allows for modelling of network traffic, hot-spot identification, and radio signal propagation. RF drive testing is a method of measuring and assessing the coverage, capacity, and Quality of Service (QOS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber experiences in an area, wireless carriers make directed changes to networks that provide better coverage and service to customers. Drive testing commonly is configured with a mobile vehicle outfitted with drive testing measurement equipment. The equipment is usually highly specialized electronic devices that interface to original equipment manufacturer (OEM) mobile handsets (UEs). This ensures measurements are realistic and comparable to actual user experiences. For mobile networks, crowdsourcing methodology leverages a crowd of participants (e.g., the mobile subscribers) to gather network measurements, either manually or automatically through mobile apps, or directly from the network using call traces.

UE/cell/MDT traces collected at the operations support systems (OSS) or through dedicated tools provide service provider(s) 116 with user-level information. Once geolocated, UE/cell/MDT traces are used to enhance path-loss calculations and prediction plots, as well as to identify and locate problem areas and traffic hotspots. KPI servers 118 allow service provider(s) 116 to use UE/cell/MDT traces along with service builder module 120 for network optimization.

In some embodiments, service builder module 120 is configured to allow a user to design one or more network slices. In some embodiments, the network slice design is GUI based. In some embodiments, operations include a user inputting basic information such as, network slice name, slice type, domains, and shared or non-shared slice selection. Other operations include defining a slice such as, service profile parameters (holds the original requirement of communication-service-instance, such as latency, data-rate, and mobility-level) requested by a northbound interface (e.g., internal to the system or manually from a user) and conversion of service profile parameters to slice profile parameters (holds the slice sub-net parameter info of different network domain slice subnet instances (NSSIs), such as RAN, transport network (TN), and CN NSSI).

Figure 2:
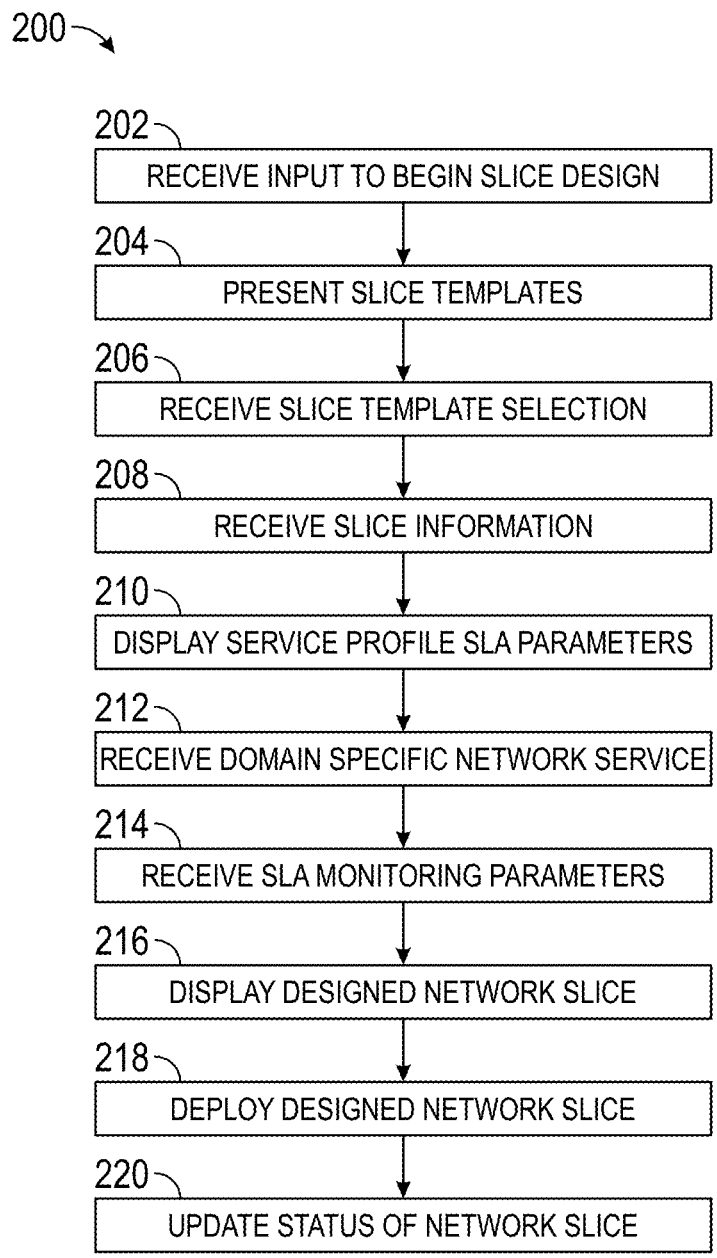
FIG. 2 is a flow diagram of method for designing a network slice, in accordance with some embodiments.
Figure 3:
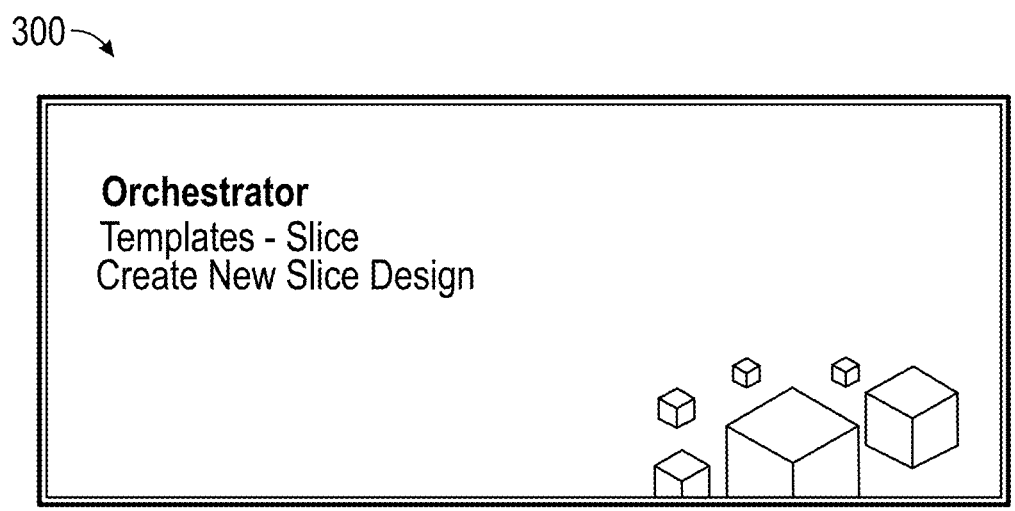

FIG. 2 is a flow diagram for a method of designing a network slice 200, in accordance with some embodiments.

FIGS. 3-15 are graphic user interfaces (GUIs) 300-1500 for designing a network slice, in accordance with some embodiments.

In some embodiments, NSD method 200 describes process tasks of network slice design. While the operations of NSD method 200 are discussed and shown as having a particular order, each operation in NSD method 200 is configured to be performed in any order unless specifically called out otherwise. NSD method 200 is implemented as a set of operations, such as operations 202 through 220.

Further, NSD method 200 is discussed with reference to FIGS. 3-15 to assist in the understanding of NSD method 200.

At operation 202 of NSD method 200, service builder module 120 receives an input from a user to begin network slice design. In some embodiments, the user is presented with GUI 300 indicating a network slice design application is starting. Process flows from operation 202 to operation 204.

At operation 204 of NSD method 200, service builder module 120 presents a list of slice templates. In FIG. 4, GUI 400 displays slice template list 402. In some embodiments, each network slice in slice template list 402 includes a status (e.g., active, or inactive), a name, a slice service type (e.g., eMBB, uRLLC, mIoT, or custom), a service category (such as home automation, high speed train, etc.), a domain (RAN, TN, CN, or E2E), a vendor, version, shared (or not), created date, and last modified date. The term template refers to a feature of a software application that defines a unique non-executable file format intended specifically for that application Process flows from operation 204 to operation 206.

At operation 206 of NSD method 200, service builder module 120 receives a user input indicating a selection of a slice template. In FIG. 4, a user points to a slice template, for example slice template 404, then clicks on the slice template. Create new slice user selection button 406 pops up and the user clicks on user selection button 406 to begin the process of creating a new slice with the selected slice template. Process flows from operation 206 to operation 208.

Figure 5:
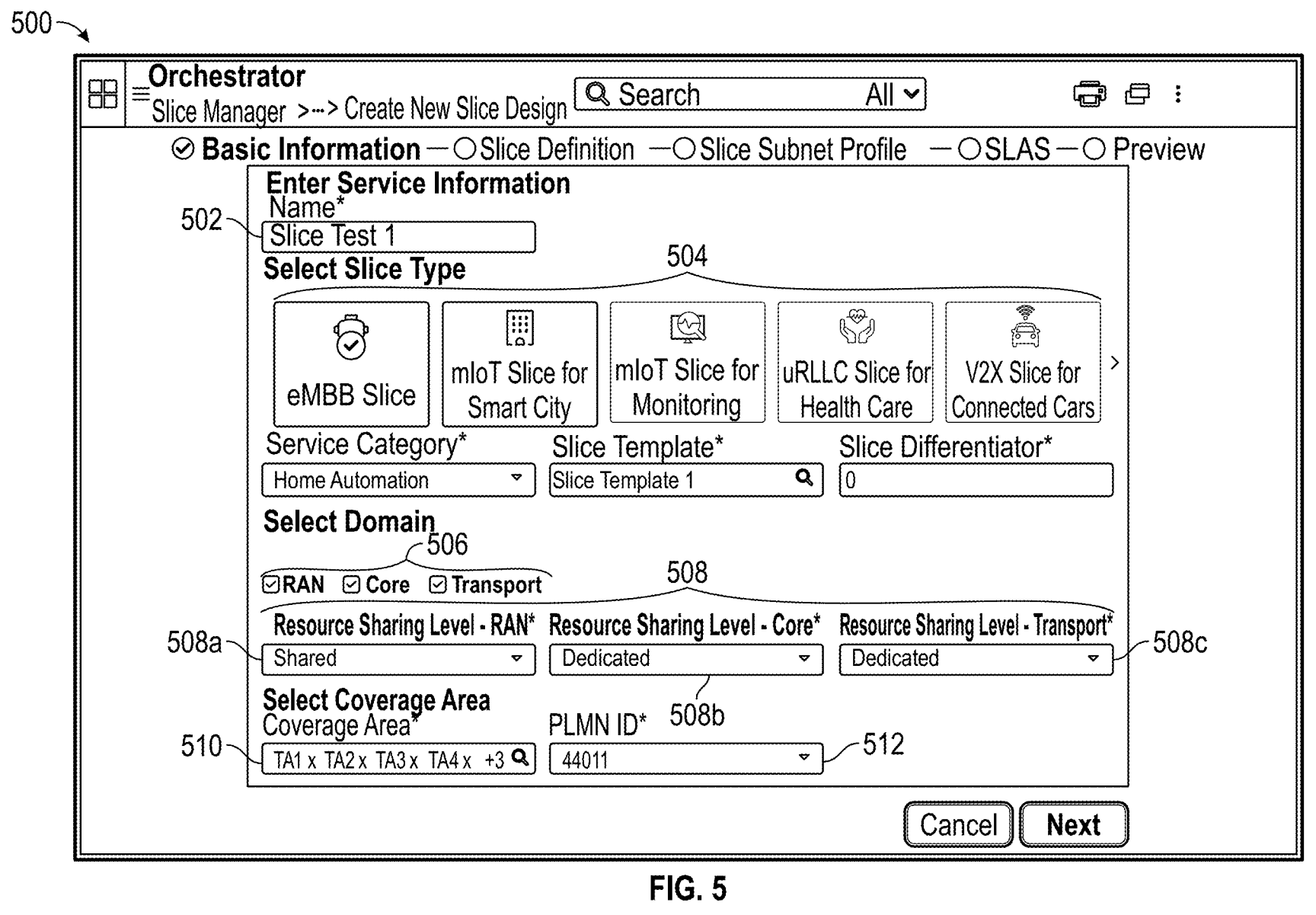

At operation 208 of NSD method 200, GUI 500 is presented, and the user inputs basic slice information. In FIG. 5, a user inputs a slice name in user input field 502, selects a slice type from user selection field 504 (e.g., eMBB or URLLC type of slice), selects domains from user selection field 506, and selects whether the slice is shared or dedicated from user selection field 508. For example, the user selects a shared or dedicated slice subnet for each domain (RAN at user selection field 508A, core at user selection field 508B, transport at user selection field 508C, or a combination of each) and coverage area of the network slice at user selection field 510. Within user selection field 512, the PLMN is chosen. In some embodiments, the PLMN selection is based upon the coverage area selected in user selection field 510. Process flows from operation 208 to operation 210.

Figure 6:

At operation 210 of NSD method 200, GUI 600 is presented, and the user sets network slice parameters. In FIG. 6, at slice parameter GUI 600, service profile SLA parameters 602 are presented and configured so the user modifies the parameters as applicable. In a non-limiting example, a user modifies an expected latency to fit the specifications of the network slice at user selection field 604 (e.g., set at 300 ms). Once the user confirms all service profile parameters within parameter field 602, for the complete end to end network slice, the user points and clicks on calculate user selection button 606. In some embodiments, this process is repeated for each domain. A slice manager (1702 FIG. 1700) calculates slice profile parameters (shown in slice profile box 608) of each domain (RAN, CORE, and transport) to meet service profile SLAs. Process flows from operation 210 to operation 212.

Figure 7:
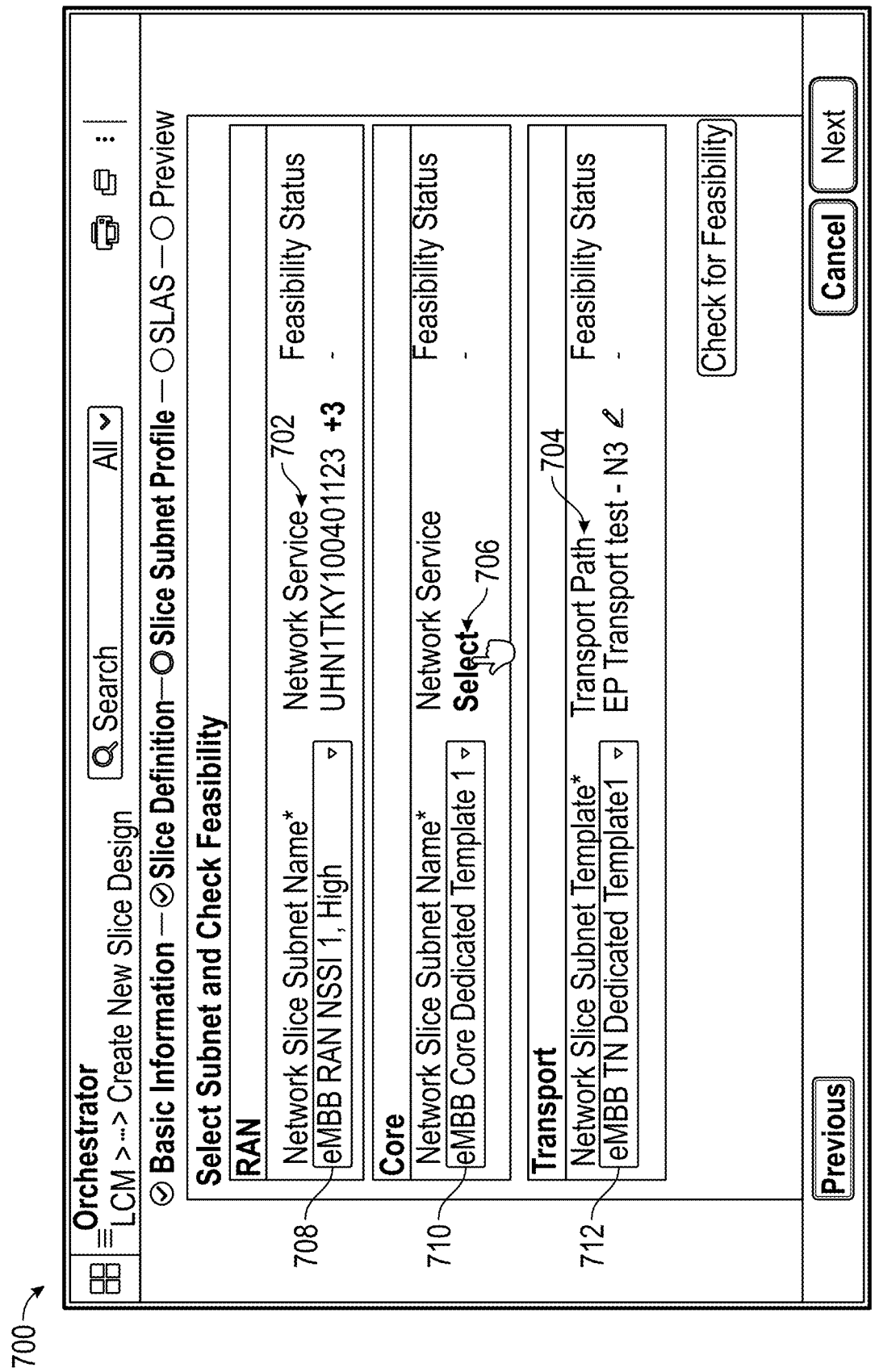

At operation 212 of NSD method 200, GUI 700 is presented, and the user selects a subnet profile, such as an already deployed domain specific network service (a shared network service or a dedicated network service). In FIG. 7, the user navigates to slice subnet profile GUI 700, where the user selects a network slice subnet name for each domain from user selection fields 708, 710, and 712. A network service associated with the slice subnet is displayed at locations 702 and 704. In response to a network service being absent from the network slice subnet, user is further able to select a network service template (where the domain is dedicated) by pointing and clicking on select user selection field 706.

Figure 8:
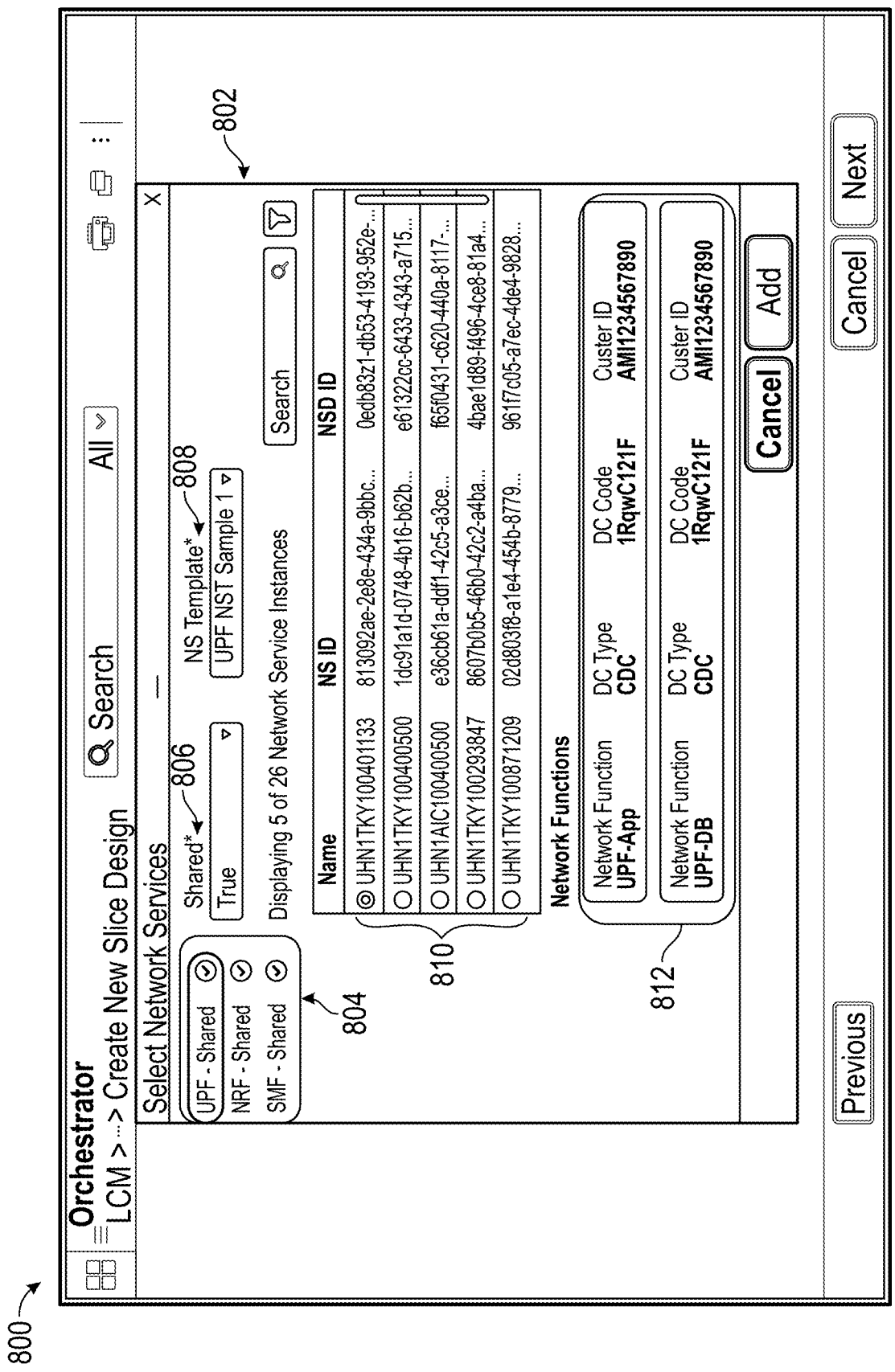

In FIG. 8, GUI 800 is presented after the user clicks on select user selection field 706, and the user is presented with a select network services pop-up box 802. As shown in network services box 804, each of the network services, such as user plane function (UPF is responsible for packet routing and forwarding, packet inspection, quality of service (QOS) handling, and external protocol data unit (PDU) session for interconnecting data network (DN) in a 5G architecture), network repository function (NRF acts as a central services broker for all network functions (NFs) in the 5G Core), or session management function (SMF is responsible for interacting with the decoupled data plane, creating updating and removing PDU sessions and managing session context with the UPF). In a non-limiting example, a user selects UPF (shown as highlighted) and within shared user input field 806 a user is presented with an indication (e.g., true) that the UPF network service is shared. A network services template name is displayed in user input field 808. A user selects network services from network services list 810. Box 812 displays the network functions associated with the selected network services selected by the user from network services list 810.

Figure 9:
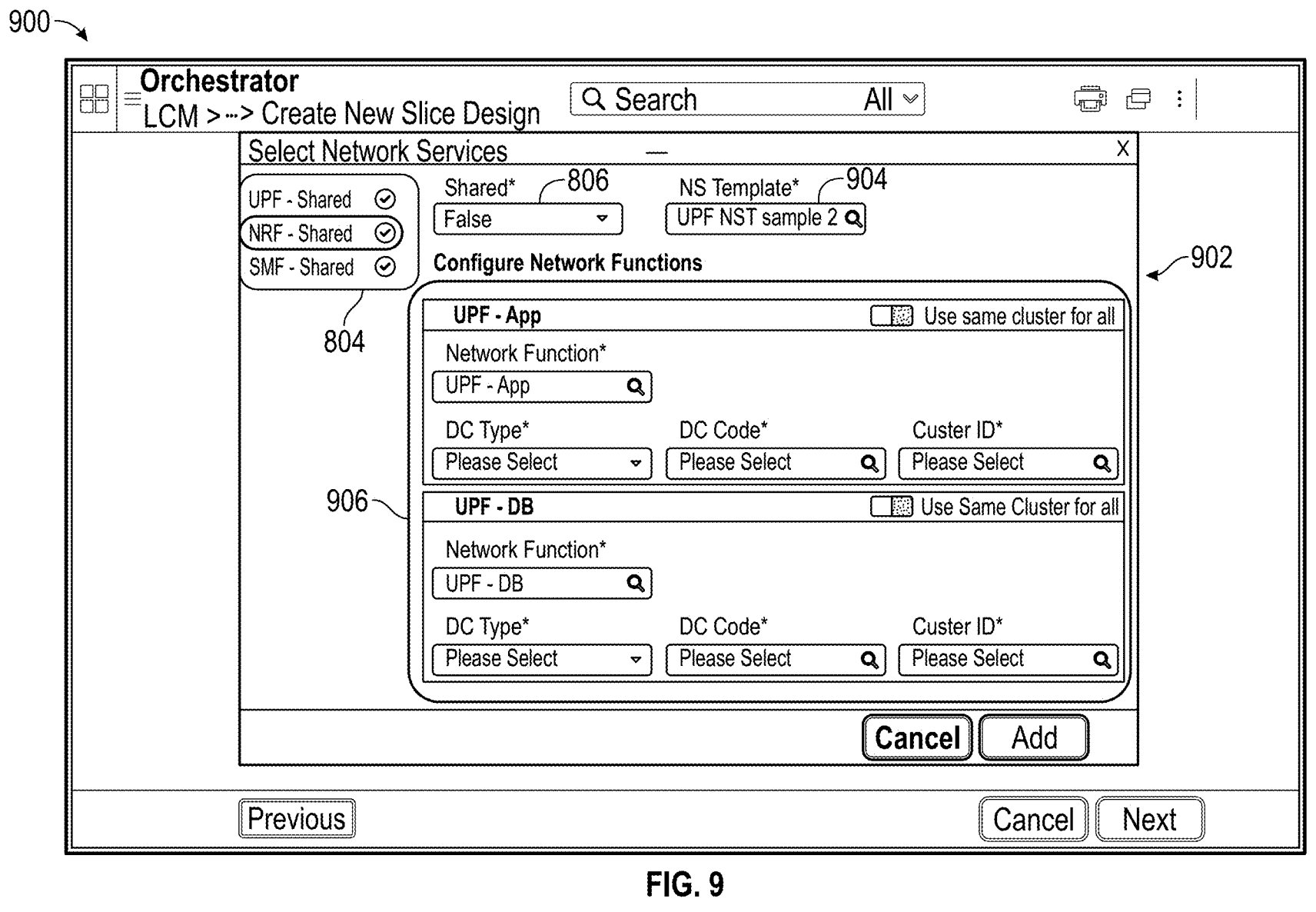

Alternatively, in FIG. 9, GUI 900 displays NRF as highlighted in network services box 804 and false being presented within shared user input field 806 indicating the NRF network service is not shared. Thus, a user fills out template 902 for a dedicated network service. The user selects a network services template in NS template user selection field 904. In response to selection of a network service template (e.g., UPF NST sample 2), the user is presented with network functions box 906. In network functions box 906 the user selects a network function (such as UPF app and UPF DB where the user selects the distributed unit type, distributed unit code, and cluster ID).

Figure 10:
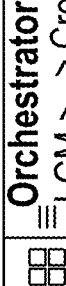

In FIG. 10, GUI 1000 is presented after each of the domains (RAN, core, and transport) include a network service. Once each domain includes a network service, the user points and clicks on feasibility user selection field 1002 and service builder module 120 determines whether the selected network services are ready to serve the new network slice.

In FIG. 11, GUI 1100 is presented when the feasibility test fails for one or more domains (e.g., the RAN domain). The user clicks on NS subnet name user selection field 1102 to select another slice subnet and recheck the feasibility by clicking on feasibility user selection field 1002.

Figure 12:
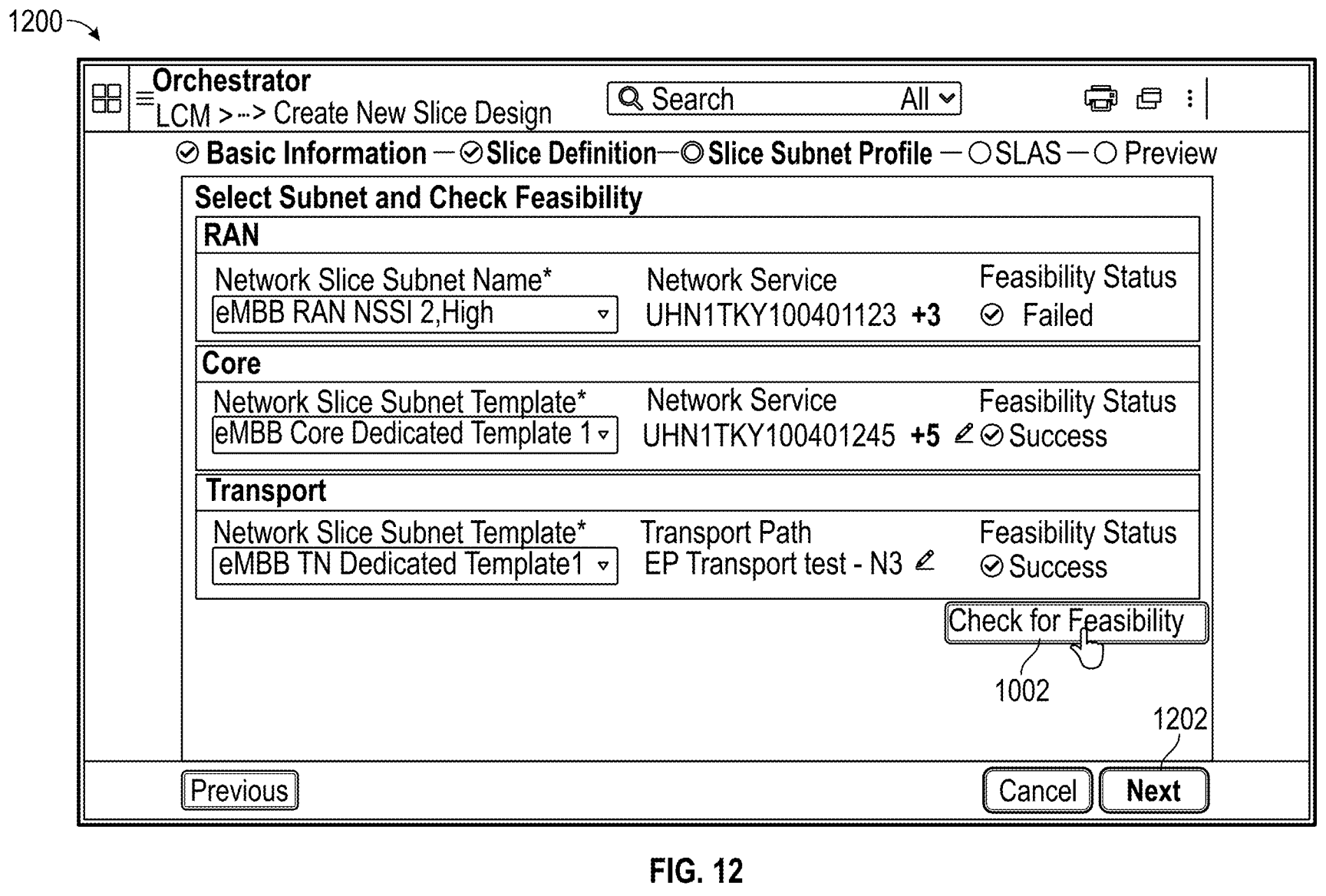

In FIG. 12, GUI 1200 is presented when the feasibility test is successful for each domain. The user clicks next user selection button 1202 to deploy the network slice. Process flows from operation 212 to operation 214.

At operation 214 of method 200, GUI 1300 is presented (FIG. 13), and the user selects SLA parameters, such as parameters and KPIs shown in parameter box 1302, to be monitored for the network slice based on one or more SLA agreements. A user searches for parameters or KPIs within search user input field 1306 for a selected domain shown in user selection field 1310. In some embodiments, the user drags and drops parameters/KPIs 1308 to parameter box 1302. Further, in response to the slice being deployed and the selection of parameters/KPIs (box 1302) to be monitored, the user selects a policy, from policy name user selection field 1304 for slice automated healing use-cases. Auto healing is a function that automatically detects disabled access points and restores the wireless network. Process flows from operation 214 to operation 216.

At operation 216 of method 200, designed network slice 1402 is displayed on GUI 1400 (FIG. 14) for the user's review. After previewing network slice 1402, including service information 1404 and automation policies 1406, the user clicks on submit user selection field 1408 after a determination the information is correct. In response to submit user selection field 1408 being clicked, GUI 1500 (FIG. 15) is displayed with a list of network slices 1502. Process flows from operation 216 to operation 218.

At operation 218 of method 200, a user deploys the designed network slice by clicking on the desired network slice in list of network slices 1502, which displays pop up box 1504 of GUI 1500. The user clicks on deploy user selection button 1506 to deploy the designed slice. In some embodiments, the slice manager (1702 FIG. 1700) makes an API call to the orchestrator (1704 FIG. 1700) and the designed slice is deployed. Process flows from operation 218 to operation 220.

At operation 220 of method 200, the status of the designed slice is updated. As seen in status box 1508, the status of the network slice is updated from designed to deployed. Other statuses include running, activation failed, deployment failed.

Figure 16:
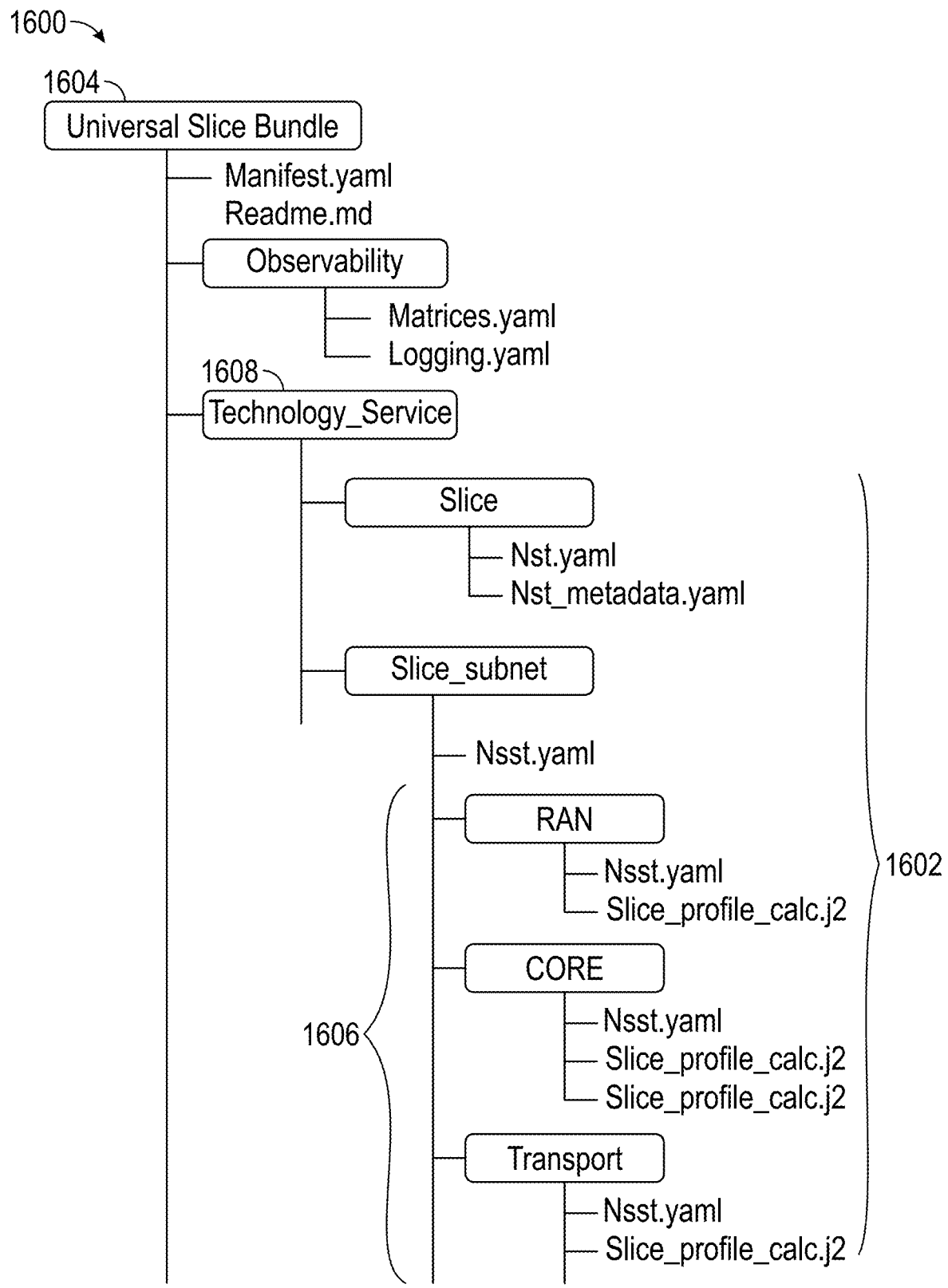
FIG. 16 is a pictorial representation of a universal slice bundle, in accordance with some embodiments.

FIG. 16 is a pictorial representation of a universal slice bundle 1600, in accordance with some embodiments.

Figure 17:
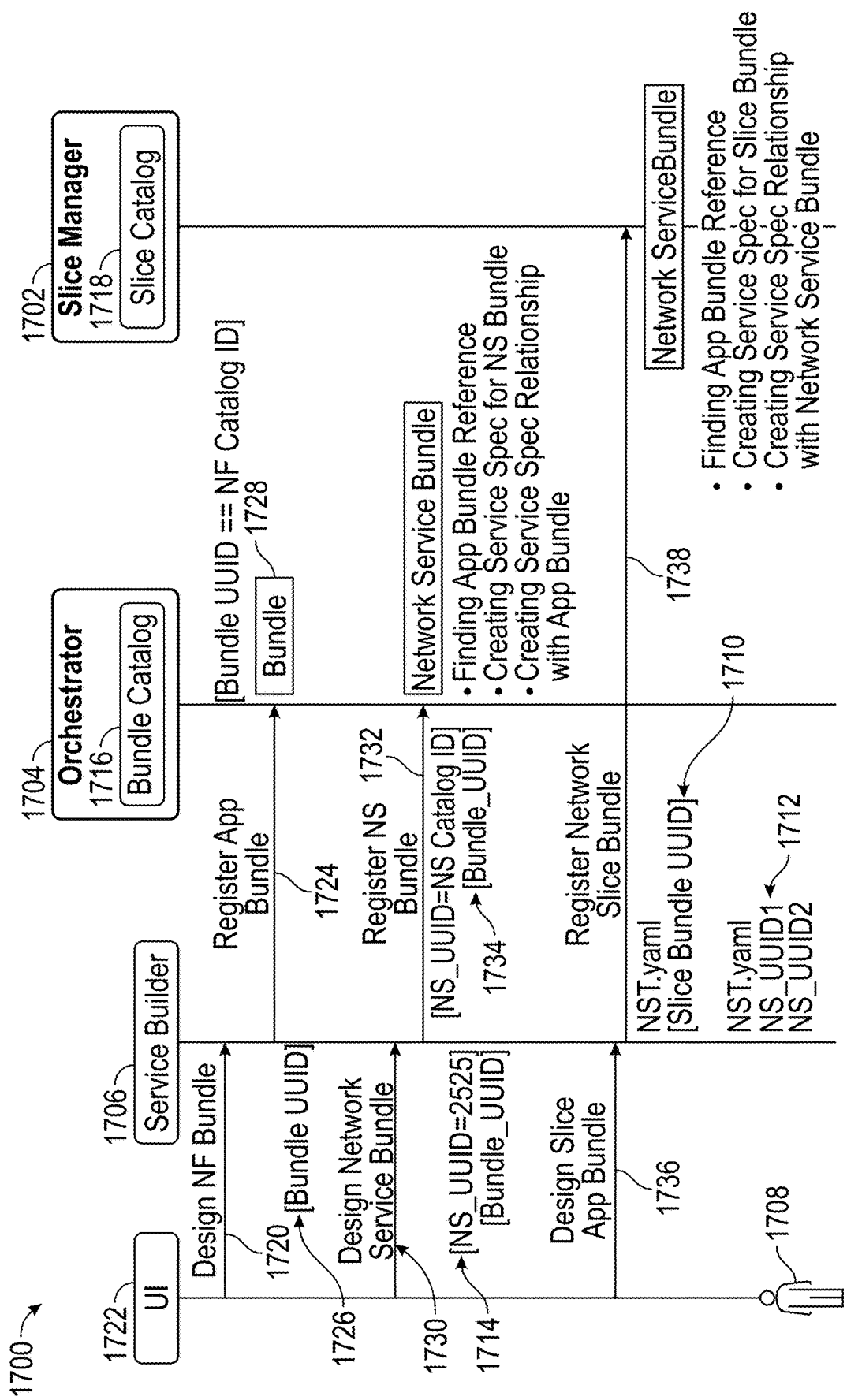
FIG. 17 is a data flow diagram of a method for network slice design, in accordance with some embodiments.

In some embodiments, a method to onboard a network slice, having cross domain interactions, that enables automated onboarding of the network slice is discussed (FIG. 17). In some embodiments, the automated process lowers the time taken to onboard a network slice as well as reducing human error.

In some embodiments, the process is a two-step process. The first process is directed toward adding folders 1602 in a universal bundle 1604 for network slice subnets 1606. In some embodiments, the first process related to creating universal slice bundle 1600 includes adding new folders 1602 that cater to network slices in a technology services folder 1608. In response to a user designing network slices on service builder module 120, service builder module 120 automatically places relevant files with relevant folders. This action assists a network slice manager (1702 FIG. 1700) to search for dedicated folders, extract network slice related files, and store the network slice related files in a slice catalog (FIG. 17).

FIG. 17 is a data flow diagram of a method for network slice design 1700, in accordance with some embodiments.

Slice manager 1702 is responsible for creating a network slice and NS subnet, whereas orchestrator 1704 is responsible for creating network services and network functions. Service builder tool 1706 is similar to service builder module 120 and includes references to network service bundles as the references are created by slice manager 1702. Further, in response to user 1708 creating the network slice bundles, user 1708 chooses available network service bundles, and service builder tool 1706 automatically adds references to unique IDs (universally unique identifier (UUID) format) of respective selected service bundles.

In some embodiments, method for network slice design 1700 describes process tasks of network slice design. While the operations of method for network slice design 1700 are discussed and shown as having a particular order, each operation in method for network slice design 1700 is configured to be performed in any order unless specifically called out otherwise. Method for network slice design 1700 is implemented as a set of operations, such as operations 1720 through 1738.

At operation 1720 of method for network slice design 1700, user 1708 designs the NF application bundle on service builder tool UI 1722. Process flows from operation 1720 to operation 1724.

At operation 1724 of method for network slice design 1700, in response to submission of the NF application, service builder tool 1706 creates a NF bundle unique ID (Bundle_UUID 1726) and automatically registers the NF or application bundle to bundle catalog 1716 of orchestrator 1704 via an application programming interface (API). In response to being registered, bundle catalog 1716 generates an ID (NF_Catalog_ID 1728) and keeps NF_Catalog_ID 1728 the same value as NF bundle unique ID (Bundle_UUID 1726). Process flows form operation 1724 to operation 1730.

At operation 1730 of method for network slice design 1700, user 1708 designs network service bundle 1714 on service builder tool UI 1722. User 1708 provides references to NF bundles 1726 included in NS bundle 1714. In response to user 1718 providing references to NF bundles 1726, the references are attached using the NF bundle unique ID (Bundle_UUID 1726). Process flows from operation 1730 to operation 1732.

At operation 1732 of method for network slice design 1700, service builder tool 1706 automatically generates network service ID (NS_UUID 1714) for a network service bundle and passes network service ID (NS_UUID 1714) and referenced NF bundle unique IDs (Bundle_UUIDs 1726) to bundle catalog 1716, where bundle catalog 1716 generates a network service bundle unique ID (NS_Bundle_UUID 1734 which has the same value as NS_UUID 1714) for reference and uses referenced NF bundle unique ID (Bundle_UUID 1726) to parse and find internal NF bundle references, create relationships between stored NFs and the newly registered network service in the bundle catalog's database, and stores the information. Process flows from operation 1732 to operation 1736.

At operation 1736 of method for network slice design 1700, user 1708 designs the NS bundle on service builder tool UI 1722. User 1708 provides references to network service bundles 1714 included in the NS bundle. In response the network service bundle references are attached using network service bundle unique IDs (NS_UUIDs 1714). In response to user 1708 creating a slice bundle (e.g., user 1708 creates nst.yaml 1710 file for a network slice and nsst.yaml files 1712 for each of the respective domains (NS subnet)), user 1708 adds reference to network service bundle IDs (e.g., NS_UUID 1714) in each nsst.yaml file 1712. Process flows from operation 1736 to operation 1738.

At operation 1738 of method for network slice design 1700, service builder tool 1706 automatically generates a slice bundle UUID 1710 for the slice bundle and passes referenced network service bundle unique IDs (NS_UUIDs 1714) to slice catalog 1718, where slice catalog 1718 generates a slice bundle UUID (Slice_Bundle_UUID 1710) for the slice catalog's references and uses network service bundle unique IDs (NS_UUID 1714) to parse and find internal network service bundle references, creates relationships between stored network services and newly registered network slices in the slice catalog's database and stores the information. Slice manager 1702 receives the slice bundle and locates the references of a network service bundle from a bundle catalog 1716 and creates the service relationship and stores the service relationship in a slice catalog 1718. Slice catalog 1718 creates a relationship with network service bundles 1714 stored in bundle catalog 1716.

Figure 18:
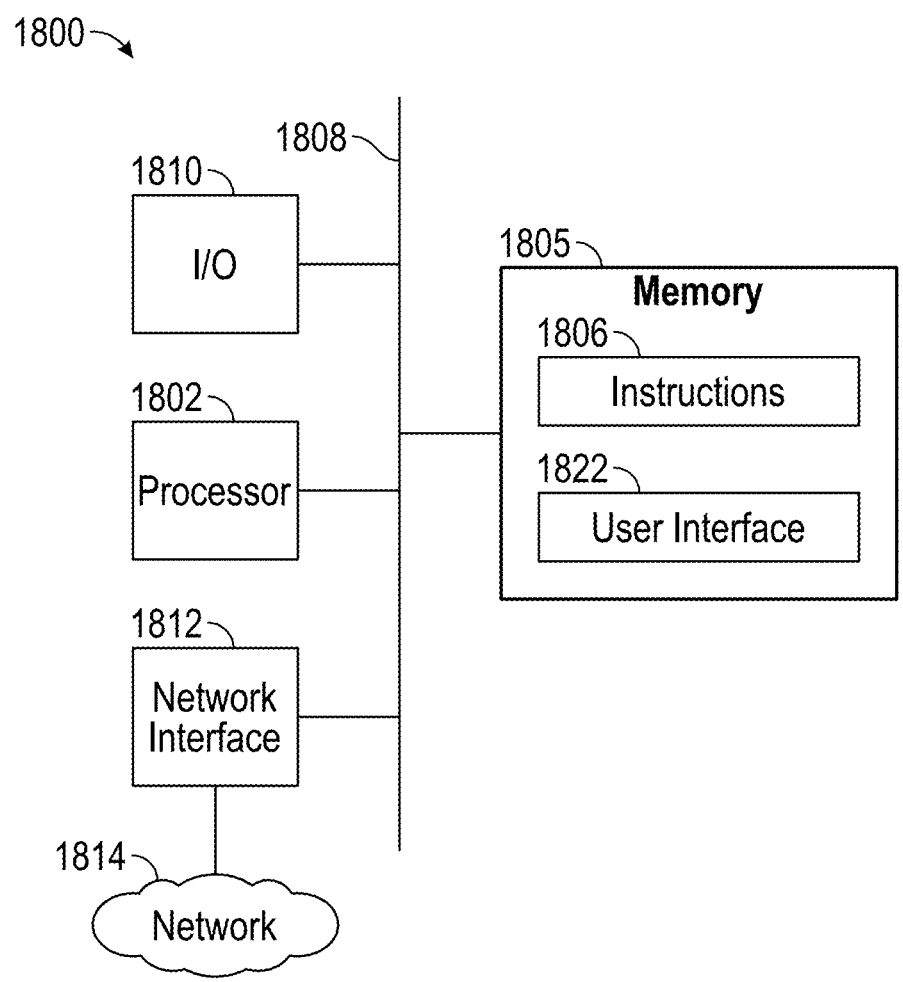
FIG. 18 is a high-level functional block diagram of a processor-based system, in accordance with some embodiments.

FIG. 18 is a block diagram of network slice design (NSD) processing circuitry 1800 in accordance with some embodiments. In some embodiments, NSD processing circuitry 1800 is a general-purpose computing device including a hardware processor 1802 and a non-transitory, computer-readable storage medium 1804. Storage medium 1804, amongst other things, is encoded with, i.e., stores, computer program code 1806, i.e., a set of executable instructions such as an algorithm, or methods 200 and 1700. Execution of instructions 1806 by hardware processor 1802 represents (at least in part) a network slice design application which implements a portion, or all the methods described herein in accordance with one or more embodiments (hereinafter, the noted processes and/or methods).

Processor 1802 is electrically coupled to a computer-readable storage medium 1804 via a bus 1808. Processor 1802 is further electrically coupled to an I/O interface 1810 by bus 1808. A network interface 1812 is further electrically connected to processor 1802 via bus 1808. Network interface 1812 is connected to a network 1814, so that processor 1802 and computer-readable storage medium 1804 connect to external elements via network 1814. Processor 1802 is configured to execute computer program code 1806 encoded in computer-readable storage medium 1804 to cause NSD processing circuitry 1800 to be usable for performing a portion or all the noted processes and/or methods. In one or more embodiments, processor 1802 is a central processing unit (CPU), a multi-processor, a distributed processing system, an application specific integrated circuit (ASIC), and/or a suitable processing unit.

In one or more embodiments, computer-readable storage medium 1804 is an electronic, magnetic, optical, electromagnetic, infrared, and/or a semiconductor system (or apparatus or device). For example, computer-readable storage medium 1804 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 1804 includes a compact disk-read only memory (CD-ROM), a compact disk-read/write (CD-R/W), and/or a digital video disc (DVD).

In one or more embodiments, storage medium 1804 stores computer program code 1806 configured to cause NSD processing circuitry 1800 to be usable for performing a portion or all the noted processes and/or methods. In one or more embodiments, storage medium 1804 further stores information, such as a mitigation algorithm which facilitates performing a portion or all the noted processes and/or methods.

NSD processing circuitry 1800 includes I/O interface 1810. I/O interface 1810 is coupled to external circuitry. In one or more embodiments, I/O interface 1810 includes a keyboard, keypad, mouse, trackball, trackpad, touchscreen, and/or cursor direction keys for communicating information and commands to processor 1802.

NSD processing circuitry 1800 further includes network interface 1812 coupled to processor 1802. Network interface 1812 allows NSD processing circuitry 1800 to communicate with network 1814, to which one or more other computer systems are connected. Network interface 1812 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more NSD processing circuitry 1800.

NSD processing circuitry 1800 is configured to receive information through I/O interface 1810. The information received through I/O interface 1810 includes one or more of instructions, data, design rules, and/or other parameters for processing by processor 1802. The information is transferred to processor 1802 via bus 1808. NSD processing circuitry 1800 is configured to receive information related to UI 1822 through I/O interface 1810. The information is stored in computer-readable medium 1804 as user interface (UI) 1822.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, a method includes generating, by a processor, a network slice bundle universally unique identifier (slice_bundle_UUID) for a network slice bundle; and generating, by the processor, a slice catalog slice_bundle_UUID, based on the slice_bundle_UUID, for use by a slice catalog; parsing and locating in the slice catalog, by the processor, one or more stored network service bundle references, based on a network service UUID (NS_UUID) referenced in the network slice bundle; and creating, by the processor, a relationship between one or more stored network services in the slice catalog and the network slice bundle.

In some embodiments, the method further includes storing, by the processor, the network slice bundle and the relationship between the one or more stored network services.

In some embodiments, before the generating the network slice bundle universally unique identifier (slice_bundle_UUID) for the network slice bundle, the method further includes receiving, by the processor, the network slice bundle, wherein the network slice bundle is created by a user on a first graphical user interface (GUI) displayed on a user interface (UI); receiving, by the processor, one or more user-created network service bundle references included with the network slice bundle; and attaching, by the processor, the one or more user-created network service bundle references with network service UUIDs (NS_UUIDs).

In some embodiments, before the receiving the network slice bundle, the method further includes generating, by the processor, the NS_UUID for the user-created network service bundle; and generating, by the processor, a slice catalog NS_bundle_UUID, based on the NS_UUID, for use by the slice catalog; parsing and locating in the slice catalog, by the processor, one or more stored network function bundle references, based on a network function UUID (bundle_UUID) referenced in the network service bundle; and creating, by the processor, a relationship between one or more stored network functions in the slice catalog and the network slice bundle.

In some embodiments, the method further includes storing, by the processor, the network service bundle and the relationship between the one or more stored network functions.

In some embodiments, before the generating the NS_UUID for the user-created network service bundle, the method further includes receiving, by the processor, the user-created network service bundle, wherein the network service bundle is created by the user on a second GUI displayed on the UI; receiving, by the processor, one or more user-created network function bundle references included with the network service bundle; and attaching, by the processor, the one or more user-created network function bundle references with network function UUIDs (bundle_UUIDs).

In some embodiments, before the receiving the network service bundle, the method further includes generating, by the processor, the bundle_UUID for the user-created network function bundle; and registering, by the processor, a network function to a bundle catalog of an orchestrator; and generating, by the processor, for the bundle catalog, a network function catalog ID (NF_catalog_ID), wherein the network function catalog ID and the bundle_UUID have a same value.

In some embodiments, before the generating the bundle_UUID for the user-created network function bundle, the method further includes receiving, by the processor, the user-created network function bundle, wherein the network function bundle is created by the user on a third GUI displayed on the UI.

In some embodiments, an apparatus includes a processor; and a memory having instructions stored thereon that, when executed by the processor, cause the processor to generate a network slice bundle universally unique identifier (slice_bundle_UUID) for a network slice bundle; and generate a slice catalog slice_bundle_UUID, based on the slice_bundle_UUID, for use by a slice catalog;
    parse and locate in the slice catalog one or more stored network service bundle references, based on a network service UUID (NS_UUID) referenced in the network slice bundle; and create a relationship between one or more stored network services in the slice catalog and the network slice bundle.

In some embodiments, the instructions further cause the processor to store the network slice bundle and the relationship between the one or more stored network services.

In some embodiments, before the generating the network slice bundle universally unique identifier (slice_bundle_UUID) for the network slice bundle, the instructions further cause the processor to receive the network slice bundle, wherein the network slice bundle is created by a user on a first graphical user interface (GUI) displayed on a user interface (UI); receive one or more user-created network service bundle references included with the network slice bundle; and attach the one or more user-created network service bundle references with network service UUIDs (NS_UUIDs).

In some embodiments, before the receiving the network slice bundle, the instructions further cause the processor to generate the NS_UUID for the user-created network service bundle; and generate a slice catalog NS_bundle_UUID, based on the NS_UUID, for use by the slice catalog; parse and locate in the slice catalog one or more stored network function bundle references, based on a network function UUID (bundle_UUID) referenced in the network service bundle; and create a relationship between one or more stored network functions in the slice catalog and the network slice bundle.

In some embodiments, the instructions further cause the processor to store the network service bundle and the relationship between the one or more stored network functions.

In some embodiments, before the generating the NS_UUID for the user-created network service bundle, the instructions further cause the processor to receive the user-created network service bundle, wherein the network service bundle is created by the user on a second GUI displayed on the UI; receive one or more user-created network function bundle references included with the network service bundle; and attach the one or more user-created network function bundle references with network function UUIDs (bundle_UUIDs).

In some embodiments, before the receiving the network service bundle, the instructions further cause the processor to generate the bundle_UUID for the user-created network function bundle; and register a network function to a bundle catalog of an orchestrator; and generate for the bundle catalog, a network function catalog ID (NF_catalog_ID), wherein the network function catalog ID and the bundle_UUID have a same value.

In some embodiments, before the generating the bundle_UUID for the user-created network function bundle, the instructions further cause the processor to receive the user-created network function bundle, wherein the network function bundle is created by the user on a third GUI displayed on the UI.

In some embodiments, a non-transitory computer readable medium having instructions stored thereon that, when executed by a processor, cause the processor to generate a network slice bundle universally unique identifier (slice_bundle_UUID) for a network slice bundle; and generate a slice catalog slice_bundle_UUID, based on the slice_bundle_UUID, for use by a slice catalog; parse and locate in the slice catalog one or more stored network service bundle references, based on a network service UUID (NS_UUID) referenced in the network slice bundle; and create a relationship between one or more stored network services in the slice catalog and the network slice bundle.

In some embodiments, the instructions further cause the processor to store the network slice bundle and the relationship between the one or more stored network services.

In some embodiments, before the generating the network slice bundle universally unique identifier (slice_bundle_UUID) for the network slice bundle, the instructions further cause the processor to receive the network slice bundle, wherein the network slice bundle is created by a user on a first graphical user interface (GUI) displayed on a user interface (UI); receive one or more user-created network service bundle references included with the network slice bundle; and attach the one or more user-created network service bundle references with network service UUIDs (NS_UUIDs).

In some embodiments, before the receiving the network slice bundle, the instructions further cause the processor to generate the NS_UUID for the user-created network service bundle; and generate a slice catalog NS_bundle_UUID, based on the NS_UUID, for use by the slice catalog; parse and locate in the slice catalog one or more stored network function bundle references, based on a network function UUID (bundle_UUID) referenced in the network service bundle; and create a relationship between one or more stored network functions in the slice catalog and the network slice bundle.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method comprising:
generating, by a processor, a network slice bundle universally unique identifier (slice_bundle_UUID) for a network slice bundle; and
generating, by the processor, a slice catalog slice_bundle_UUID, based on the slice_bundle_UUID, for use by a slice catalog;
parsing and locating in the slice catalog, by the processor, one or more stored network service bundle references, based on a network service UUID (NS_UUID) referenced in the network slice bundle;
creating, by the processor, a relationship between one or more stored network services in the slice catalog and the network slice bundle; and
deploying, by the processor, the network slice bundle based on the relationship created between one or more stored network services in the slice catalog and the network slice bundle.

2. The method of claim 1, further comprising:
storing, by the processor, the network slice bundle and the relationship between the one or more stored network services.

3. The method of claim 1, wherein before the generating the network slice bundle universally unique identifier (slice_bundle_UUID) for the network slice bundle, the method further comprising:
receiving, by the processor, the network slice bundle, wherein:
the network slice bundle is created by a user on a first graphical user interface (GUI) displayed on a user interface (UI);
receiving, by the processor, one or more user-created network service bundle references included with the network slice bundle; and
attaching, by the processor, the one or more user-created network service bundle references with network service UUIDs (NS_UUIDs).

4. The method of claim 3, wherein before the receiving the network slice bundle, the method further comprising:
generating, by the processor, the NS_UUID for the user-created network service bundle; and
generating, by the processor, a slice catalog NS_bundle_UUID, based on the NS_UUID, for use by the slice catalog;
parsing and locating in the slice catalog, by the processor, one or more stored network function bundle references, based on a network function UUID (bundle_UUID) referenced in the network service bundle; and
creating, by the processor, a relationship between one or more stored network functions in the slice catalog and the network slice bundle.

5. The method of claim 4, further comprising:
storing, by the processor, the network service bundle and the relationship between the one or more stored network functions.

6. The method of claim 4, wherein before the generating the NS_UUID for the user-created network service bundle, the method further comprising:
- receiving, by the processor, the user-created network service bundle, wherein:
  - the network service bundle is created by the user on a second GUI displayed on the UI;
- receiving, by the processor, one or more user-created network function bundle references included with the network service bundle; and
- attaching, by the processor, the one or more user-created network function bundle references with network function UUIDs (bundle_UUIDs).

7. The method of claim 6, wherein before the receiving the network service bundle, the method further comprising:
- generating, by the processor, the bundle_UUID for the user-created network function bundle; and
- registering, by the processor, a network function to a bundle catalog of an orchestrator; and
- generating, by the processor, for the bundle catalog, a network function catalog ID (NF_catalog_ID), wherein the network function catalog ID and the bundle_UUID have a same value.

8. The method of claim 7, wherein before the generating the bundle_UUID for the user-created network function bundle, the method further comprising:
- receiving, by the processor, the user-created network function bundle, wherein:
  - the network function bundle is created by the user on a third GUI displayed on the UI.

9. An apparatus, comprising:
- a processor; and
- a memory having instructions stored thereon that, when executed by the processor, cause the processor to:
  - generate a network slice bundle universally unique identifier (slice_bundle_UUID) for a network slice bundle; and
  - generate a slice catalog slice_bundle_UUID, based on the slice_bundle_UUID, for use by a slice catalog;
  - parse and locate in the slice catalog one or more stored network service bundle references, based on a network service UUID (NS_UUID) referenced in the network slice bundle;
  - create a relationship between one or more stored network services in the slice catalog and the network slice bundle; and
  - deploy the network slice bundle based on the relationship created between one or more stored network services in the slice catalog and the network slice bundle.

10. The apparatus of claim 9, wherein the instructions further cause the processor to:
- store the network slice bundle and the relationship between the one or more stored network services.

11. The apparatus of claim 9, wherein before the generating the network slice bundle universally unique identifier (slice_bundle_UUID) for the network slice bundle, the instructions further cause the processor to:
- receive the network slice bundle, wherein:
  - the network slice bundle is created by a user on a first graphical user interface (GUI) displayed on a user interface (UI);
- receive one or more user-created network service bundle references included with the network slice bundle; and
- attach the one or more user-created network service bundle references with network service UUIDs (NS_UUIDs).

12. The apparatus of claim 11, wherein before the receiving the network slice bundle, the instructions further cause the processor to:
- generate the NS_UUID for the user-created network service bundle; and
- generate a slice catalog NS_bundle_UUID, based on the NS_UUID, for use by the slice catalog;
- parse and locate in the slice catalog one or more stored network function bundle references, based on a network function UUID (bundle_UUID) referenced in the network service bundle; and
- create a relationship between one or more stored network functions in the slice catalog and the network slice bundle.

13. The apparatus of claim 12, wherein the instructions further cause the processor to:
- store the network service bundle and the relationship between the one or more stored network functions.

14. The apparatus of claim 12, wherein before the generating the NS_UUID for the user-created network service bundle, the instructions further cause the processor to:
- receive the user-created network service bundle, wherein:
  - the network service bundle is created by the user on a second GUI displayed on the UI;
- receive one or more user-created network function bundle references included with the network service bundle; and
- attach the one or more user-created network function bundle references with network function UUIDs (bundle_UUIDs).

15. The apparatus of claim 14, wherein before the receiving the network service bundle, the instructions further cause the processor to:
- generate the bundle_UUID for the user-created network function bundle; and
- register a network function to a bundle catalog of an orchestrator; and
- generate for the bundle catalog, a network function catalog ID (NF_catalog_ID), wherein the network function catalog ID and the bundle_UUID have a same value.

16. The apparatus of claim 15, wherein before the generating the bundle_UUID for the user-created network function bundle, the instructions further cause the processor to:
- receive the user-created network function bundle, wherein:
  - the network function bundle is created by the user on a third GUI displayed on the UI.

17. A non-transitory computer readable medium having instructions stored thereon that, when executed by a processor, cause the processor to:
- generate a network slice bundle universally unique identifier (slice_bundle_UUID) for a network slice bundle; and
- generate a slice catalog slice_bundle_UUID, based on the slice_bundle_UUID, for use by a slice catalog;
- parse and locate in the slice catalog one or more stored network service bundle references, based on a network service UUID (NS_UUID) referenced in the network slice bundle;
- create a relationship between one or more stored network services in the slice catalog and the network slice bundle; and
- deploy the network slice bundle based on the relationship created between one or more stored network services in the slice catalog and the network slice bundle.

18. The non-transitory computer readable medium of claim 17, wherein the instructions further cause the processor to:

store the network slice bundle and the relationship between the one or more stored network services.

19. The non-transitory computer readable medium of claim 17, wherein before the generating the network slice bundle universally unique identifier (slice_bundle_UUID) for the network slice bundle, the instructions further cause the processor to:

receive the network slice bundle, wherein:

the network slice bundle is created by a user on a first graphical user interface (GUI) displayed on a user interface (UI);

receive one or more user-created network service bundle references included with the network slice bundle; and attach the one or more user-created network service bundle references with network service UUIDs (NS_UUIDs).

20. The non-transitory computer readable medium of claim 19, wherein before the receiving the network slice bundle, the instructions further cause the processor to:

generate the NS_UUID for the user-created network service bundle; and generate a slice catalog NS_bundle_UUID, based on the NS_UUID, for use by the slice catalog;

parse and locate in the slice catalog one or more stored network function bundle references, based on a network function UUID (bundle_UUID) referenced in the network service bundle; and create a relationship between one or more stored network functions in the slice catalog and the network slice bundle.

* * * * *